Feb. 18, 1969 F. MARR 3,427,748
GUIDING ARRANGEMENT FOR SLIDING WINDOWS OF AUTOMOTIVE VEHICLES
Filed Jan. 23, 1968

INVENTOR.
FRITZ MARR
BY
McGlew & Toren
ATTORNEYS

INVENTOR.
FRITZ MARR
BY
McGlew & Toren
ATTORNEYS

INVENTOR.
FRITZ MARR
BY
McGlew & Toren
ATTORNEYS

United States Patent Office 3,427,748
Patented Feb. 18, 1969

3,427,748
GUIDING ARRANGEMENT FOR SLIDING
WINDOWS OF AUTOMOTIVE VEHICLES
Fritz Marr, Offenbach am Main, Germany, assignor to
Firma H. T. Golde G.m.b.H., Frankfurt am Main,
Germany
Filed Jan. 23, 1968, Ser. No. 699,843
Claims priority, application Germany, Jan. 24, 1967,
G 49,064; Nov. 29, 1967, G 51,776
U.S. Cl. 49—352        20 Claims
Int. Cl. B24b 9/02

ABSTRACT OF THE DISCLOSURE

A guiding arrangement for slidable windows of automotive vehicles, the windows being of the type which can be raised and lowered relative to a window well in the body of the vehicle, is disclosed as including at least one guide rail extending parallel to the direction of motion of the window pane during raising and lowering of the latter. This rail has at least one longitudinal leg extending perpendicular to the plane of the window pane, and may have other longitudinal legs extending parallel to the plane of the window pane.

A relatively flat supporting plate is fastened on a bar or the like which is secured to the lower edge of the window pane, and this plate carries guide members spaced longitudinally of the guide rail, each guide member being formed with a slot closely embracing a leg of the guide rail. The slot provides parallel guide surfaces whose spacing is substantially that of the thickness of the leg of the guide rail, and these guide surfaces engage opposite surfaces of the leg.

Various arrangements are disclosed for various types of window operators. In the particular case where the window operator is a cable guided in a slotted tube extending parallel to the direction of window pane motion, the guide rail may be fixed relative to the guide tube as by spot welding or the like.

Background of the invention

Sliding automotive vehicle windows, of the type to which the guiding arrangement of the present invention is applicable, and which are operated by a hand crank or an electric drive, require no additional guide for the window pane if the two lateral edges of the pane are parallel to each other. The reason for this is that the pane is guided, in any opening position and also in the closing position laterally in the rails. Thereby, canting of the pane about a horizontal axis, extending perpendicularly to the plane surface of the window pane, with resultant jamming of the pane in its lateral guide rails, is not possible. In these cases, it is only necessary to provide, on the bottom edge of the window pane, a single point of engagement for the power transmitting means, in order to move the glass pane. This single point is usually arranged midway between the two lateral pane edges, or approximately beneath the center of gravity of the window pane.

In many cases, however, the lateral pane edges are not parallel to each other, but converge in an upward direction. Thus, one of the two lateral edges of the window pane will emerge completely, or over a major part of its length, from its guide, even when the window is opened only slightly. In these cases, a suitable parallel guide must be provided to make sure that the other lateral edge remains in its guide. Primarily, this is achieved by a special design of the window lifter, but such window lifters of special design are much more complicated and expensive than window lifters having only one point of application of force to the window pane.

Thus, for example, if there is used a cable-type window lifter which transmits the actuating force by means of a stiff cable sliding in a slotted tube and with a window pane connecting member extending through the tube slot, a meander-shaped form of the guide tube is used in order to obtain two spaced cable and guide tube sections extending parallel to the direction of window displacement and for connection to the window at two points of force application. An equally complicated design is necessary in so-called rope window lifters, because at least four guide rollers must be arranged in order to provide two parallel spaced rope sections extending in the direction of motion of the window pane for application of force to two points on the bottom edge of the window pane. Finally, arm-type or scissor-type window lifters, which are already of relatively heavy construction, must be so designed, for two points of application of force to the window, that two arms, or two oppositely directed scissor arms, insure, in any opening position of the window pane, parallel guiding of the pane.

Parallel guides for window panes having non-parallel lateral edges are also known, wherein the power or force transmitting element of the window lifter is connected with the bottom edge of the pane at only one point of application of force. In these arrangements, a sheet metal section guide rail is fixedly positioned to extend in the direction of motion of the window in the window recess. Spaced rollers or sliding elements are mounted for displacement on this guide rail, and these guide a lifting bar engaging the bottom edge of the pane and connected with the power transmitting means of a manually or electrically operated window lifter. The guiding is effected parallel to the direction of motion of the window.

Such a parallel guide is disclosed, for example, in German Auslegeschrift DAS 106,286, and comprises a multipart roller slide engaged by an arm-type window lifter and guided on a one-part bar having a complicated profile. In a window guide shown in German Patent No. 1,170,262, sliding elements are substituted for the guide rollers. These sliding elements, however, have a no less complicated form in order to provide them with self-resilient properties. These properties, which do not permit the transmission of greater canting forces without a disadvantageous deformation of the sliding elements, are necessary because considerable and unavoidable manufacturing tolerances of the guide way must be compensated in this known arrangement of a multi-part, complicated guide rail. In addition, the two known parallel guides just mentioned have the serious disadvantage, from an economical assembly standpoint, that the window lifter and the parallel guide must be arranged separately and adjusted relative to each other.

From British Patent No. 983,444, there is known a cable window lifter which can be mounted as a single piece, because the cable guide tube itself, serving as a support for a guide rail rigidly connected thereto, also constitutes a guide element of the parallel guiding arrangement. This arrangement also requires guide rollers which, in this case, are adjustable to some extent by means of eccentric devices in order to equalize or compensate anticipated manufacturing tolerances.

Summary of the invention

This invention relates to guiding arrangements for sliding windows of automotive vehicles and, more particularly, to an improved and simplified guiding arrangement particularly useful with window panes having non-parallel lateral edges.

The objective of the invention is to avoid disadvantages of known window pane guides having a single point of application for the power transmitting means of a window lifter, preferably a cable window lifter. In particular, the aim of the invention is to provide a very simple window pane guide which is preferably integral with the window lifter and including a sliding guide having a low manufacturing tolerance range and very little play, and which requires no subsequent readjustment during assembly.

In accordance with the invention, the disadvantages of prior art arrangements are obviated by providing plural, preferably two, sliding elements engaging at least one leg of an elongated guide rail, these sliding elements having parallel, spaced and facing guide surfaces whose spacing corresponds substantially to the plate thickness of the guide rail, and which guide surfaces slide on opposite faces of the guide rail leg and thus embrace both opposite surfaces of the latter. Thus the pane guiding arrangement includes guideways which are formed by the plate thickness of the guide rail, which is formed from a plate. Consequently, manufacturing tolerances depend substantially only on variations of the plate thickness, and these variations are held within very low limits in commercially produced plates. Since the distance between the facing guide faces of the sliding elements can also be set, in production, with a very small tolerance range, a practically play-free sliding guide of very simple design is formed. This is particularly true since no attention need be paid, in the design of the guide rail, to special roller forms or sliding blocks. It is necessary merely to insure a sufficient rigidity of the rail, and this is obtained automatically by corresponding bending of the plate section to form the section legs constituting the guideway or guideways.

If only canting of the pane about a substantially horizontal axis perpendicular to the pane surface is to be prevented, it is entirely sufficient if the guide rail is a simple angle plate having one leg substantially perpendicular to the surface of the window pane and engaging the sliding elements. However, in an equally simple manner, the invention can provide a parallel guiding arrangement where the pane is secured not only against canting about a horizontal axis perpendicular to the pane but also is secured against canting about the horizontal axis parallel to the pane. This is effected by providing the guide rail with one guiding leg extending perpendicularly to the pane and the other guiding leg extending parallel to the pane surface. This provides two guideway forming legs arranged in different planes to guide the sliding elements. In accordance with the invention, this is advantageously attained, from a construction standpoint, by having the two legs of the angle plate form a right angle with each other. Naturally, the guide rail can also be formed by joining several suitably profiled guide rail parts to obtain guideway forming legs oriented in different planes. If the guiding arrangement is to be provided in a window construction involving relatively strong forces which can effect canting of the window pane, in accordance with the invention the guide rail can have a U-section whose two legs extend parallel to each other and substantially perpendicular to the pane surface, both of these legs guiding the sliding elements.

In accordance with the invention, the sliding elements are solid bodies, and their facing guide surfaces are the side walls of a slot receiving the leg of the guide rail, the depth of the slot being a multiple of the thickness of the plate forming the guide rail. These guide slots can be produced within a narrow tolerance range, comparable to thickness variations of the plate, so that a parallel guiding of the window pane, with a minimum of lateral play, can be obtained, with corresponding adaptation of the slot width to the plate thickness and without the necessity of special and complicated adjusting means.

In order to assure that the sliding elements are always aligned with the guide leg of the guide rail, the sliding elements are preferably non-rotatably mounted on a supporting plate detachably secured on the lifting bar secured to the lower edge of the window pane. Such non-rotatable mounting is preferably attained by providing the sliding elements, at least at their fastening ends, with at least one plane surface with which they engage correspondingly profiled recesses in the supporting plate. Where the guiding arrangement of the invention is designed to prevent canting, turning, or both of the window pane about several axes, an advantageously simple construction is provided if the supporting plate has portions bent therefrom to lie in different planes and to support the guiding elements. The number of these bent portions corresponds to the number of guide rail legs.

The window pane guiding arrangement of the invention is designed preferably, but not exclusively, for use in connection with a cable-type window lifter of known design, and which includes a cable guide tube having a length at least equal to the effective stroke length of the window carrier secured on the cable, this cable guide tube being arranged in the direction of motion of the window. In accordance with the invention, the guide rail is secured to the cable guide tube in a known manner, as by welding or the like. The legs of the guide rail forming the guides for the sliding elements are arranged in spaced parallel relation with the cable guide tube, and the driver or the like on the cable is fixedly connected with the supporting plate for the sliding elements. This design has advantages from the assembly standpoint in that the pane guide is, in effect, integral with the window lifter, and both the operator for the window lifter and the guide arrangement may be connected to the wall of the vehicle body or to the inner plate of the vehicle door by suitable fastening means.

Attachment of the sliding elements to the supporting plate can be simplified by providing these elements, at both sides of their respective guide slot and perpendicularly to the supporting plate, with the fastening recesses by means of which the sliding elements can be attached on projections protruding perpendicularly from the supporting plate. The sliding elements need not be formed with a profiled fastening lug to secure them against turning, which lug would engage in a corresponding recess in the supporting plate. Thus, this function is absorbed by the fastening recesses in cooperation with the projections on the supporting plate. This further avoids additional fastening tongues which have to be folded over, because the sliding elements seat tightly, but in a readily detachable manner, on the projections of the supporting plate. By suitable selection of the fit between the elements and the projections, the sliding elements can be replaced rapidly and even without tools, if necessary. Since the projections are adjacent the guide slots of the sliding elements over a certain distance, corresponding entirely or nearly entirely to the depth of the slot, this design has the additional substantial advantage that the guide surfaces of the slot remain exactly plane-parallel, even with considerable canting forces acting on the guide, because they are supported by the projections. Bending of the slots under load is consequently impossible under any operating conditions.

In a preferred embodiment of the invention, simplicity and efficiency are attained by forming the projections as bent formations of the supporting plate, and by providing a slot in each projection. The fastening recesses in the sliding elements are preferably continuous slots whose width is about equal to the thickness of the supporting plate. The bases of these slots are spaced from each other at a distance corresponding substantially to the width of the slot in the bent up portion of the supporting plate.

For economical production of the sliding elements with constant dimensions, the elements are preferably injection molded from a thermoplastic material, for example a material selected from the group of polyoxymethylene resins or polyacetal resins.

That embodiment of the invention provided with two guide ways or guide rails arranged in respective different planes and intersecting preferably at a right angle can be readily adopted to guiding the curved windows frequently used in modern automotive vehicles. In such case, the sliding elements engaging the legs of the guide rails aligned parallel to the plane are provided with guide surfaces which are convex in the direction of motion and whose smallest spacing corresponds approximately to the plate thickness of the guide rail. These sliding elements are secured on the supporting plate on projections which are preferably bent out of the supporting plate. Due to the convex form of the guide surfaces, a guiding of the window with positive securement against rotation about the axes mentioned above, in any position of the window pane and even with a very small radius of curvature of the surved guide rails, is attainable. The guiding is very smooth, because the sliding elements with the convex guide surfaces are practically in linear contact with the guiding legs of the guide rails. These elements can also be secured to the supporting plate in a simple manner.

The securement or fastening of the sliding elements to the supporting plate is preferably so designed that the lug is arranged perpendicularly to the guide rail and embraces the guiding leg extending parallel to the window pane and the sliding element guided on this leg. Bending of the guide slot under load is impossible, due to the tight embracing by the lug under all operating conditions.

The form-closed fastening is attained by providing the lug, forming the mouth opening, with a projection of which at least the inner edge is parallel to the supporting plate and engages a slot in the sliding element. That side of the sliding element opposite the slot bears flat on the supporting plate. In this manner, a firmly fixed position of the sliding element on the supporting plate, and at the same time a very flat design, are formed, because the sliding elements bear directly on the supporting plate. Preferably the guide rail receiving slot in the sliding element is intersected by a slot provided in the rear surface of the sliding element and which receives the adjacent lug edge.

An object of the invention is to provide an improved and simplified guiding arrangement for sliding windows of automotive vehicles.

Another object of the invention is to provide such a guiding arrangement in which only a single point of connection to the window pane is necessary.

A further object of the invention is to provide such a guiding arrangement which is adaptable to many forms of window operators.

Still another object of the invention is to provide such a guiding arrangement which can be readily adapted to the parallel guiding of curved window panes.

A further object of the invention is to provide such a guiding arrangement which restrains canting or rotation of the window pane about any one of two or more mutually perpendicular axes.

Another object of the invention is to provide such a guiding arrangement which is particularly adaptable for use with window panes whose lateral edges are non-parallel.

A further object of the invention is to provide such a guiding arrangement capable of forming a substantially unitary assembly with a known type of cable window operator mechanism.

*Brief description of the drawings*

For an understanding of the principles of the invention, reference is made to the following description of typical embodiments thereof, as illustrated in the accompanying drawings.

In the drawings.

*Description of the preferred embodiments*

Figure 1:
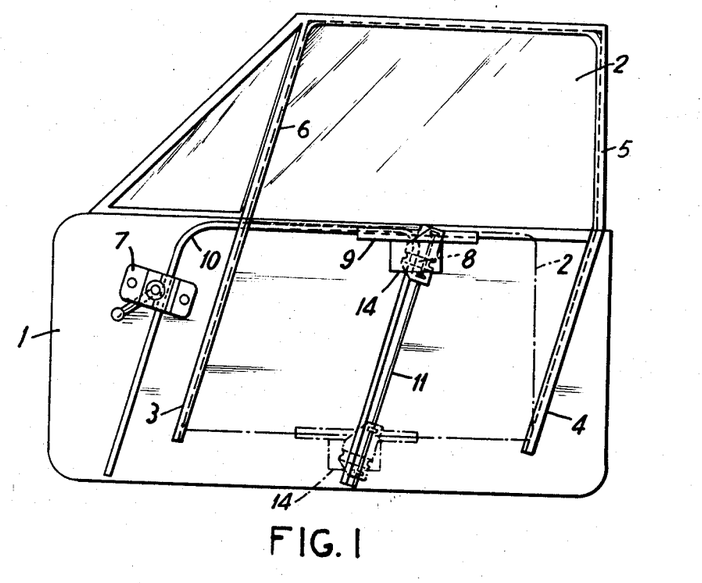
FIG. 1 is an inside elevation view of a motor vehicle door with a cable type window lifter and a window guiding arrangement embodying the invention.
Figure 2:
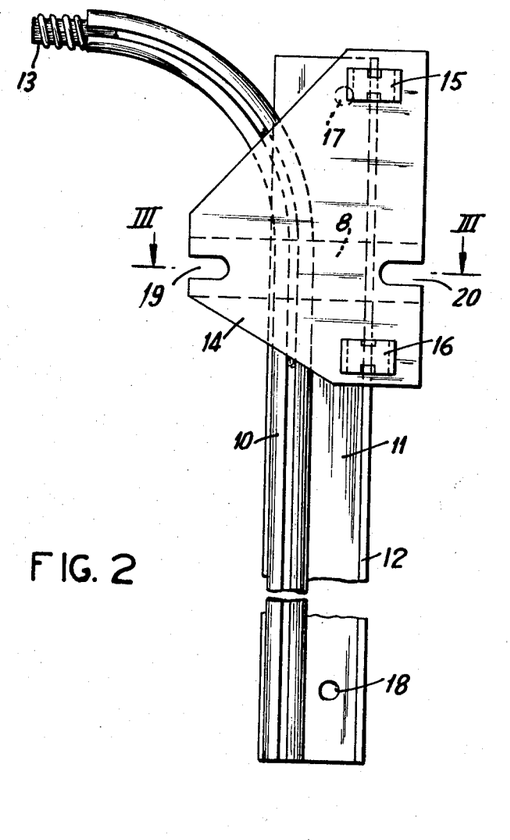
FIG. 2 is an elevation view, to a larger scale, of the window guiding arrangement as removed from the door, and illustrating details of the guiding arrangement.
Figure 3:
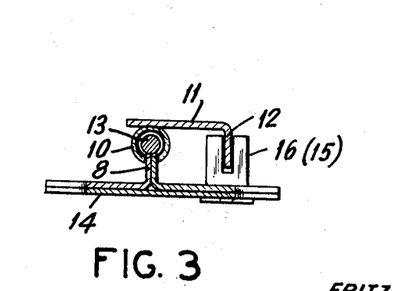
FIG. 3 is a transverse sectional view taken on the line III—III of FIG. 2.

Referring to FIGS. 1, 2 and 3, FIG. 1 illustrates, somewhat schematically, a cable-type window lifter which is installed in a door 1 having a window pane 2 which can be moved upwardly and downwardly in the direction of the pane guides 3 and 4. The lateral edges of pane 2 are not parallel, but converge toward a point above the door. Thus, the right lateral edge of pane 2 moves out of window frame 5 even when the window is opened only slightly, while the left lateral edge of pane 2 remains in the frame portion 6 extending from pane guide 3. During descending movement of pane 2, only its bottom righthand corner slides in pane guide 4. In many cases, pane guide 3 already terminates directly beneath the upper door limiting line, so that pane 2 engages guides 3 and 4 only at diagonally opposed corners in the fully opened position as represented in the drawing by broken lines. It will be obvious that, with this design, there is an increased tendency of the pane to canting about an axis extending perpendicularly to the surface of pane 2.

FIG. 1 also illustrates the window drive housing 7 with the hand crank for operating the window, the driver 8 of the cable drive, and the lever bar 9 secured on driver 8 and engaging the bottom edge of pane 2. The cable drive includes a cable guide tube 10 extending at least throughout the effective stroke length of driver 8 parallel to the guides 3, 4 and 6, and formed with a slot extending longitudinally thereof during this portion of its length. In place of the lever bar 9, there could be provided any other known type of connection to the pane wherein the driver directly engages the glass and is secured thereto through bores for screw or rivet joints and the like. Cable type window lifters with the parts 7 and 10 are so well known, for example from U.S. Patent No. 3,280,509, that a detailed description of this type of window driving mechanism is believed unnecessary.

The relatively short guiding of driver 8 in the slot of guide tube 10, as shown more particularly in U.S. Patent No. 3,190,140, does not insure sufficient security against canting of pane 2 about a horizontal axis extending perpendicular to the surface of the pane. According to the invention, an angle cross section plate 11 is therefore secured on guide tube 10, for example by welding, in such a way that its leg 12 extends exactly parallel to the guide tube, as best seen in FIG. 2. Driver 8 is secured on the pressure-stiff cable 3 in a known manner, and is guided in guide tube 10 for longitudinal displacement. Driver 8 is fixedly mounted, for example by spot welding, on a supporting plate 14 carrying sliding elements 15 and 16 which are guided displaceably along leg 12 and which embrace both surfaces of leg 12. The design and the securement of the sliding elements 15 and 16 are described more fully hereinafter.

Angle cross section plate 11, constituting the guide rail for parallel guidance of window pane 2, is secured on the inner plate of the door through the medium of bores 17 and 18, usually by means of screw-type joints, so that the entire window lifter can be secured in place at the same time. It is only necessary for the drive housing 7 to be additionally secured on the inner plate of the door. The design just described has the advantage that guide rail 11 need not be assembled separately on the door body, but is secured thereto together with the window lifter and using only two screws. There is thus no increase in the number of screws as compared to the number necessary for a single-track cable window lifter without a guide for sliding elements.

The opposite sides of supporting plate 14 are formed with respective recesses 19 and 20 for securement of supporting plate 19 to lever bar 9. Angle cross section plate 11, with its leg 12, and sliding elements 15 and 16 can be so varied in their dimensions, depending on the size and weight of window pane 2, that a stable parallel guide is always obtained. This guide positively absorbs all forces acting about an axis extending perpendicularly to the pane, so that canting and obstructions to movement during displacement of pane 2 are prevented.

Figure 4:
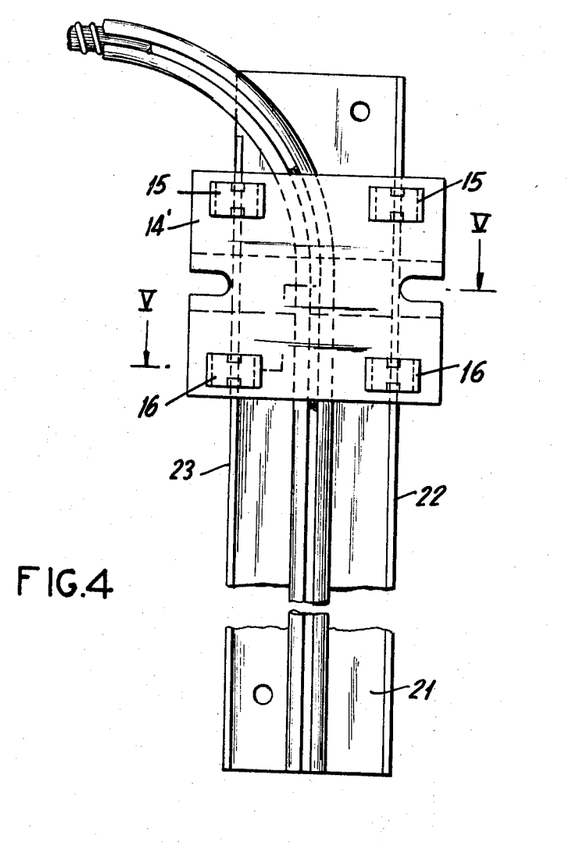
FIG. 4 is a view, similar to FIG. 2, illustrating another embodiment of the guiding arrangement in accordance with the invention.
Figure 5:
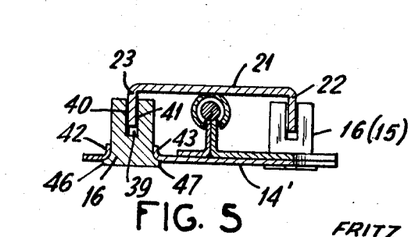
FIG. 5 is a transverse sectional view on the line V—V of FIG. 4.

In the slightly modified embodiment of the guiding arrangements shown in FIGS. 4 and 5, the guide rail is a double guide rail which is used when relatively strong forces, which can effect canting, must be expected in the door construction, the sliding window construction, or both. In this embodiment, the guide rail is a U-cross section member 21 having parallel legs 22 and 23 extending substantially perpendicularly to the surface of pane 2, this guide rail being substituted for the angle cross section plate 11. Legs 22 and 23 each carry two sliding elements 15 and 16 secured on supporting plate 14'.

Figure 6:
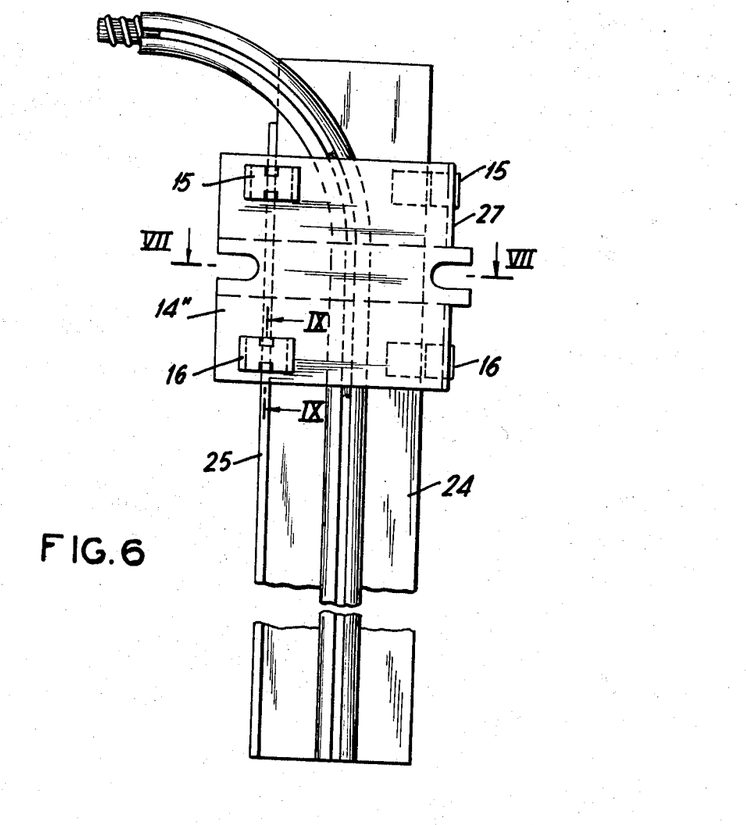
FIG. 6 is a view similar to FIGS. 2 and 4 and illustrating a third embodiment of a guiding arrangement in accordance with the invention.
Figure 7:
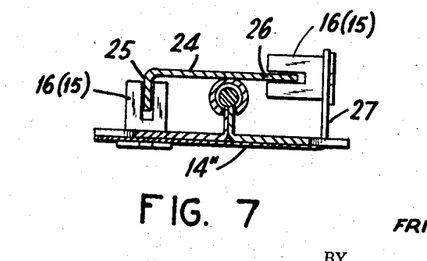
FIG. 7 is a transverse sectional view taken on the line VII—VII of FIG. 6.

The guiding arrangements illustrated in FIGS. 1 through 5 secure window pane 2 against turning about an axis extending perpendicularly to the pane surface. If it is desired to secure the pane additionally against turning about a horizontal axis extending parallel to the pane, or against turning about an axis extending in the direction of motion of the pane, or both, the pane guiding arrangements shown in FIGS. 6 through 8 can be used. Referring to FIGS. 6 and 7, the guide rail again is a simple angle cross section plate 24 having two legs 25 and 26 for guiding sliding elements 15 and 16. Leg 26, and the sliding elements 15 and 16 engaging this leg, secure pane 2 additionally against turning about the two axes just mentioned. Supporting plate 14" is, in this case, also an angular cross section plate whose leg 27, bent toward the plane of pane 2, carries the sliding elements associated with leg 26 of guide rail 24.

The pane guiding arrangement shown in FIGS. 2 and 3 affords the best possible utilization of the height available in the recess, particularly since with a corresponding design of supporting plate 14, angle cross section plate 11 can be extended through the upper arc of guide tube 10 and serve there also as a guide rail. This can be done even though driver 8, which cannot enter the bend, reaches its upper end position at a point substantially lower, where the conditions are rather limited because of the smaller overall height of the door box as compared to the overall stroke of the sliding window.

Figures 8, 10:
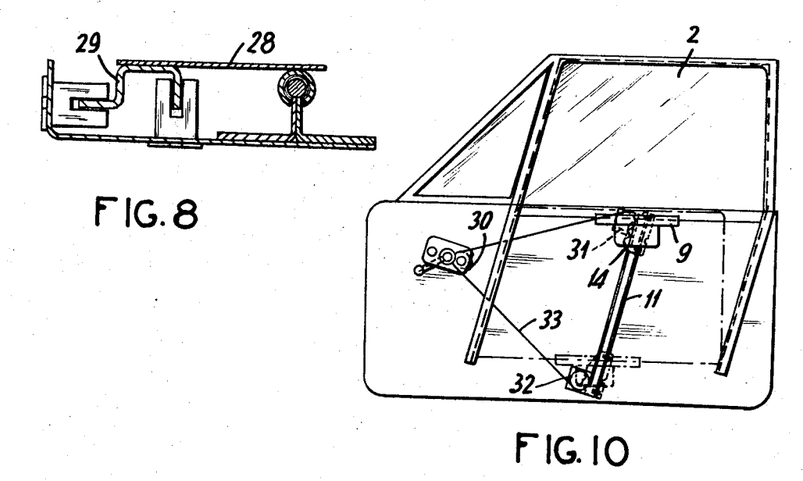
FIG. 8 is a view similar to FIG. 7 but illustrating a modified form of guide rail.
FIG. 10 is an inside elevation view of a motor vehicle door with a cable type window lifter and a window guiding arrangement of the type shown in FIGS. 2 and 3.

FIG. 8 illustrates a pane guiding arrangement wherein the guide rail is constituted by plate section parts 28 and 29 secured together, for example, by means of spot welding. The effect and the construction of this embodiment corresponds exactly to those of the embodiments shown in FIGS. 6 and 7.

The pane guiding arrangement of the invention is not limited to use with cable-type window lifters of the type shown in FIGS. 1 through 8. Thus, in the cable-type window lifter shown in FIG. 10, driving of pane 2 is effected by a cable drum 30, rotated by a hand crank, through the medium of a cable 33 trained over guide rollers 31 and 32 secured on the inner plate of the door. Cable 33 is connected either with lever bar 9 or a part secured thereon. A supporting plate 14 is secured on the lever bar 9, or its equivalent, in the same manner as described above, and the guide rail, designed as an angular cross section plate 11 as in FIGS. 2 and 3, is secured on the inner plate of the door.

Figure 11:
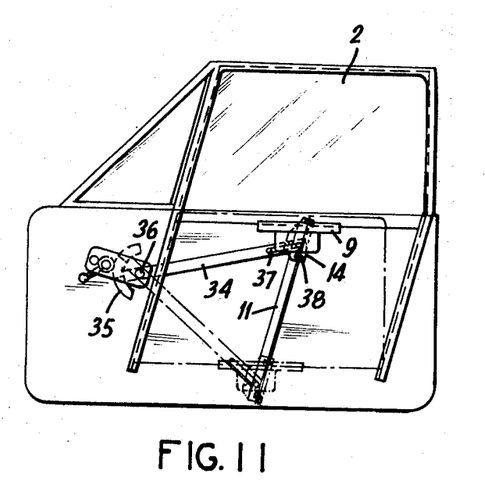
FIG. 11 is an inside elevation view of a motor vehicle door with an arm-type window lifter and a window guiding arrangement of the type shown in FIGS. 2 and 3.

In the arm-type window lifter shown in FIG. 11, actuating torque as applied with the hand crank is transmitted to the sector gear 35 connected with lever arm 34, and turns arm 34, in a direction to open or close the window, about a journal 36. Lever arm 34 has a slot 37 in which is engaged a journal 38 fixedly connected with the structural elements such as the lever bar 9 or the supporting plate 14. In this embodiment also, the guide rail is an angle cross section plate 11. The window lifters illustrated in FIGS. 10 and 11 are so well known that a detailed description of the design and operation is believed unnecessary. As in FIG. 1, the window pane shown in FIGS. 10 and 11, and the parts engaging this pane, are shown in solid lines in the closed position of the window pane while the broken lines represent the wide open position of the window pane.

Sliding elements 15 and 16 are solid bodies formed, for example, from either a plastic composition material (synthetic resin) or metal. The plastic composition material, or synthetic resin, may be, for example, that known to the trade as "Polyamide 6," whereas the metal may be, for example, sintered steel. The overall design, and the manner of securement of the sliding elements to the supporting plate, can be seen best from FIGS. 5 and 9. Referring to these figures, the sliding elements are formed with a guide slot 39 whose side walls form the guide surfaces 40 and 41 having a spacing corresponding to about the thickness of the plate from which the guide rail is formed. The spacing is slightly greater than the thickness of the plate.

Figure 9:
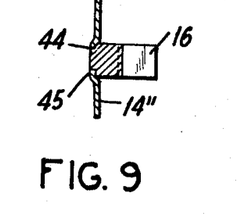
FIG. 9 is a sectional view through a sliding element embodying the invention, taken along the line IX—IX of FIG. 6.

The sliding elements have a polygonal, for example, a rectangular, cross section, corresponding to the shape of the securing recesses in the supporting plate. The recesses are so formed that lateral guide tongues 42 and 43 position each sliding element, and fastening tongues 44 and 45, to anchor each guiding element, are struck out from the guiding plate and, after insertion of the sliding element into its recess, are bent over. Each sliding element has lateral projections or extensions 46 and 47 bearing on the rear surface of the supporting plate, and these cooperate with fastening tongues 44 and 45 to assure the adjusted position of the sliding elements as determined during manufacture.

Figures 12, 13:
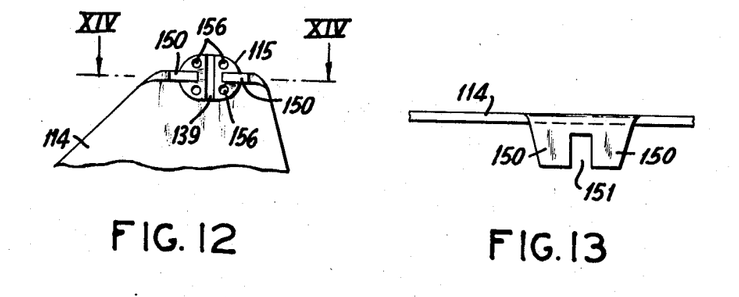
FIG. 12 is a partial elevation view of a supporting plate with a modified form of sliding element.
FIG. 13 is a partial top plan view of the arrangement shown in FIG. 12.

The supporting plate 114 shown in FIGS. 12 and 13 corresponds substantially to the supporting plate 14 shown in FIG. 2, so that a complete representation of plate 114 is believed unnecessary. Naturally, the lower end of the supporting plate, in the same manner as the upper end, carries a sliding element such as 115. FIGS. 12 and 13 illustrate projections 150, for mounting the sliding elements, formed by right angled bends from supporting plate 14, with each projection 150 having a slot 151.

Figure 14:
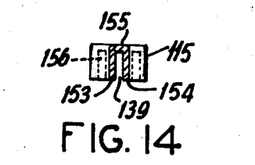
FIG. 14 is a sectional view through the sliding element taken along the line XIV—XIV of FIG. 12.
Figure 15:
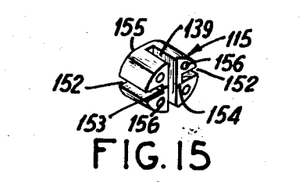
FIG. 15 is a perspective view of the sliding element of FIGS. 12 and 14.

Each sliding element 115 is formed with three continuous slots, as best seen in FIGS. 14 and 15. These slots include the guide slot 139 opening toward the outer end face of the sliding element to receive the guide rail (not shown), and the two laterally outwardly opening slots 152 for receiving the projections 150. In order to attain a firm clamping fit of sliding element 15 on supporting plate 114, the width of slots 152 is made slightly less than the thickness of supporting plate 114 and/or the spacing between the bases of the slots 152 is made slightly greater than the width of slot 151 in projection 150.

As best seen in FIGS. 12 and 15, the edges of sliding element 115 are rounded off, which permits saving material without impairing the slot dimensions which are important for the mounting operation. By virtue of this rounding off, sliding element 15 practically consists of four corner sections having a substantially circular sector-shaped cross section, the four corner sections being joined with each other by web 153, 154 and 155. Sliding element 115 can be produced very economically and accurately as to its measurements as a plastic injection molded part, with all the slots being formed by injecting molding. In order to avoid deformations of the slot walls by the unavoidable shrinking during cooling of thermoplastic materials, mass-reducing recesses 156 are provided in the corner sections, and these need not extend throughout the entire depth of the sliding element, as indicated in FIG. 14 by the broken line.

The description of FIGS. 12 through 15 relates to a guiding arrangement wherein two sliding elements are provided on a supporting plate. Naturally, it is possible, within the scope of the invention, to use more than two sliding elements, as represented in FIGS. 5, 7 and 8 and described above. To this end, it is merely necessary to provide bent portions of the supporting plate at the corresponding points in order to form the projections 150 just described. It is not necessary to provide these bent portions at the outer edges of the supporting plate or the like, as the bent portions can also be bent out from inner plate regions if desired, after making corresponding cuts or punchings. It is also within the scope of the present invention to secure the fastening projections, as separate parts, on the supporting plate or the like, and they may take, for example, the form of slotted angle cross section plates.

A pane guiding arrangement designed especially for window panes curved in the direction of motion of the pane, and for correspondingly curved guide rails, is shown in FIGS. 16 through 20. Referring to these figures, the supporting plate 124 corresponds, in form and arrangement substantially to the supporting plate 14 of FIG. 2. However, there is a substantial difference in that, in addition to the sliding elements 215 and 216 guided on leg 225 of guide rail 229, supporting plate 124 carries sliding elements 260 and 261 designed and arranged, in accordance with the invention, to engage leg 226 of guide rail 229 which is oriented parallel to the window pane (not shown) and to supporting plate 214. The effect achieved is thus primarily the same as that achieved with the guiding arrangement shown in FIGS. 7 and 8.

Sliding elements 215 and 216 are secured on bent tongues 250 of supporting plate 214, these tongues extending perpendicularly to the plane of the supporting plate. The design of these sliding elements 215 and 216, and their securing to plate 214, correspond to the design and mounting shown in FIGS. 12 through 15. Slot-shaped recesses 219 and 220 in plate 214 serve to secure the latter on the lever bar 9 (not shown). The pressure-stiff cable 13, which is displaceable axially in guide tube 210, is fixedly connected with supporting plate 214 through driver 208, in the present case, for example, by spot welding.

Sliding elements 260 and 261 are preferably made of a suitable plastic composition material or synthetic resin, for example, a polyamide, a polyoxymethylene, or a polyacetal resin, with all of the recesses described hereinafter being formed simultaneously during forming of the sliding elements. Sliding elements 260 and 261 have a smaller spacing than do the sliding elements 215 and 216, so that adaptation to the guiding rail 229 for guiding curved window panes is facilitated.

Figure 18:
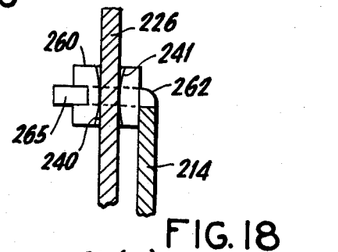
FIG. 18 is a sectional view taken on the line XVIII—XVIII of FIG. 16, and to a larger scale.
Figure 19:
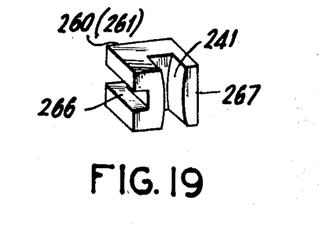
FIG. 19 is a perspective view, looking from one side, of a sliding element used in the embodiment of the invention shown in FIG. 16.
Figure 20:
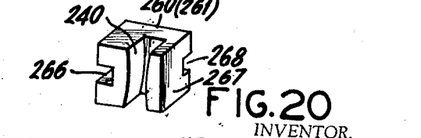
FIG. 20 is a perspective view of the sliding element shown in FIG. 16, but looking from the other side.

FIGS. 18 through 20 clearly illustrate the convex form of guide surfaces 240 and 241. These surfaces can have the form of a circular arc, for example, with a radius that can be about twice the magnitude of the guiding length of one of the surfaces 240 or 241, which is present over about half the length of these surfaces, corresponds approximately to the plate thickness of guide rail 229 and preferably is slightly greater than such plate thickness. The curvature of guide rail 229, and the corresponding curvature of guide tube 210, are not shown in the drawings for reasons of simplicity.

Figure 17:
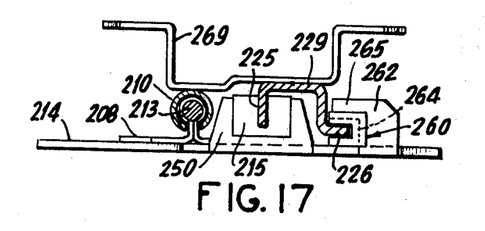
FIG. 17 is a top plan view corresponding to FIG. 16.

To secure sliding elements 260 and 261 on plate 214, lugs or tongues 262 and 263 are bent at right angles from the plane of supporting plate 214 and formed with notches 264. Each notch 264 is defined by a projection 265 extending parallel to supporting plate 214, as best seen in FIGS. 17 and 18, and each notch 264 engages a slot 266 of sliding elements 260 and 261. The opposite lateral surface 267 of each sliding element bears flat against supporting plate 214. However, in order to obtain a tight fit while allowing the sliding elements to be disengaged without tools, the distance between supporting plate 214 and the inner edge of projection 265 parallel to the supporting plate is slightly less than the distance between the base of slot 266 on the lateral surface 267. Slot 268 (FIG. 20) in the rear face of each sliding element receives the adjacent edge of lug 262 or 263, respectively, and thus contributes to securing of the sliding element 260 or 261, respectively.

Figure 16:
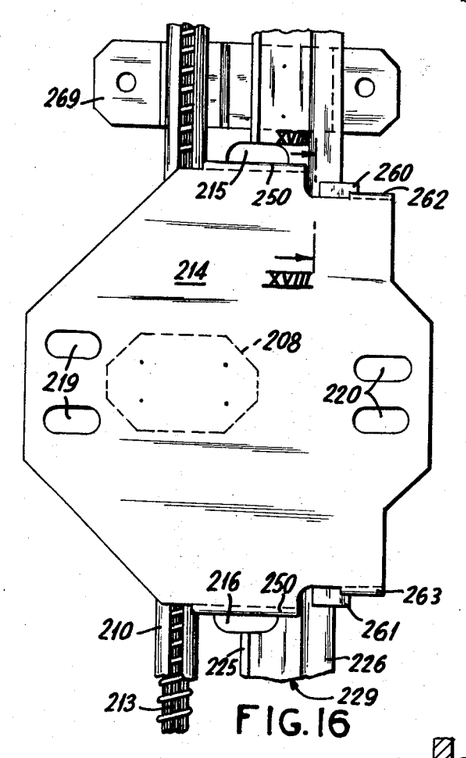
FIG. 16 is a partial elevation view of a pane guiding arrangement in accordance with the invention provided for the guiding of curved window panes and arranged for use with a cable-type window lifter.

In this embodiment of the invention, guide rail 229 and guide tube 210 are maintained in mutually spaced parallel relation by several stirrup-shaped holders 269 on which rail 229 and tube 210 are secured, for example by spot welding. Holders 269, of which only one is represented in the drawing, also serve to mount the guide arrangement on the door plate, which has not been shown.

While specific embodiments of the invention have been shown and described in detail to illustrate the application of the principles of the invention, it will be understood that the invention may be embodied otherwise departing from such principles.

What is claimed is:

1. A guiding arrangement, for guiding a sliding window pane during raising and lowering thereof, relative to a window receiving well, by a driving device having a power transmitting element connected to the lower edge of the window pane, said guiding arrangement comprising, in combination, a relatively elongated fixedly positioned guide rail formed with at least one flange extending parallel to the direction of movement of said window pane; at least two sliding elements slidably engaged with each flange and spaced longitudinally therealong; and means mounting said sliding elements in fixed relation to said window pane for guiding said window pane during raising and lowering thereof; each sliding element having a pair of substantially parallel facing guide surfaces engaging respective opposite surfaces of the associated flange, the spacing of said guide surfaces being substantially equal to the thickness of the associated flange.

2. A guiding arrangement, for guiding a sliding window pane during raising and lowering thereof, as claimed in claim 1, in which said sliding elements are injection moldings of thermoplastic material selected from the group consisting of polyamides, polyoxymethylenes, and polyacetals.

3. A guiding arrangement, for guiding a sliding window pane during raising and lowering thereof, as claimed in claim 1, in which said guide rail has a U-shaped cross section and includes two legs extending substantially parallel to each other and each oriented substantially perpendicularly to the surface of said window pane; each leg constituting a flange and having at least two sliding elements slidably engaged therewith.

4. A guiding arrangement, for guiding a sliding window pane during raising and lowering thereof, as claimed in claim 1, in which said guide rail is an angular cross section plate having one leg oriented substantially perpendicular to the surface of said window pane and constituting a flange slidably engaged by said sliding elements.

5. A guiding arrangement, for guiding a sliding window pane during raising and lowering thereof, as claimed in claim 1, in which said guide rail is an angular cross section plate having one leg oriented substantially parallel to the surface of said window pane and constituting a flange slidably engaged by said sliding elements.

6. A guiding arrangement, for guiding a sliding window pane during raising and lowering thereof, as claimed in claim 5, in which said guide rail has a second leg oriented substantially perpendicular to the surface of said window pane and constituting a flange slidably engaged by said sliding elements.

7. A guiding arrangement, for guiding a sliding window pane during raising and lowering thereof, as claimed in claim 6, in which said two legs form a right angle with each other.

8. A guiding arrangement, for guiding a sliding window pane during raising and lowering thereof, as claimed in claim 5, in which said guide surfaces are elongated in the direction of movement of said sliding elements and are convex in such direction of movement; the minimum spacing of said guide surfaces corresponding substantially to the thickness of the associated flange; said means mounting said sliding elements comprising a supporting plate having lugs projecting therefrom; each lug mounting a respective sliding element.

9. A guiding arrangement, for guiding a sliding window pane during raising and lowering thereof, as claimed in claim 8, in which said lugs comprise portions bent out from said supporting plate.

10. A guiding arrangement, for guiding a sliding window pane during raising and lowering thereof, as claimed in claim 9, in which each lug is oriented perpendicularly to said guide rail and embraces the associated flange and the associated sliding element slidably engaged with the associated flange.

11. A guiding arrangement, for guiding a sliding window pane during raising and lowering thereof, as claimed in claim 10, in which each lug includes a projection having as least its inner edge extending substantially parallel to said supporting plate to define, with the latter, a recess; the projection of each lug engaging a slot in one side of the associated sliding element, and the opposite side of the associated sliding element bearing flat against said supporting plate.

12. A guiding arrangement, for guiding a sliding window pane during raising and lowering thereof, as claimed in claim 11, in which each sliding element has a rear surface joining the surface having said slot formed therein and the surface engaged with said supporting plate; said rear surface being formed with a second slot forming a continuation of the first-mentioned slot and receiving the adjacent edge of the associated lug.

13. A guiding arrangement, for guiding a sliding window pane during raising and lowering thereof, as claimed in claim 1, in which each of said sliding elements is a solid body formed with a slot extending therethrough, the sidewalls of said slot constituting said substantially parallel facing guide surfaces and said slot receiving the associated flange; the depth of said slot being a multiple of the thickness of the associated flange.

14. A guiding arrangement, for guiding a sliding window pane during raising and lowering thereof, as claimed in claim 13, in which said means mounting said sliding elements comprises a supporting plate, said slots in said sliding elements opening outwardly substantially perpendicular to said supporting plate; each of said sliding elements being formed with a pair of mounting slots therein, one on each side of first mentioned slot constituting a guiding slot; said supporting plate being formed with tongues projecting substantially perpendicularly therefrom and engaged in said mounting slots to mount said sliding elements on said supporting plate.

15. A guiding arrangement, for guiding a sliding window pane during raising and lowering thereof, as claimed in claim 14, in which said projecting tongues comprise bent portions of said supporting plate; the free edge of each tongue being formed with an outwardly opening substantially rectangular recess therein; said mounting slots in said sliding elements each extending throughout the length of the respective sliding element and opening outwardly substantially perpendicularly to the walls of said guiding slot; the width of each mounting slot being substantially equal to the thickness of said supporting plate, and the distance between the bases of the slots of each pair mounting slots being substantially equal to the width of said substantially rectangular recesses.

16. A guiding arrangement, for guiding a sliding window pane during raising and lowering thereof, as claimed in claim 1, in which said means mounting said sliding elements comprises a supporting plate detachably secured to an element connected to the lower edge of said window pane and to said transmitting element; said sliding elements being non-rotatably mounted on said supporting plate.

17. A guiding arrangement, for guiding a sliding window pane during raising and lowering thereof, as claimed in claim 16, in which said sliding elements comprise solid bodies each formed with a slot extending therethrough, the side walls of said slot constituting said substantially parallel facing guide surfaces and each slot receiving the associated flange, the depth of each slot being a multiple of the thickness of the associated flange; each sliding element having a mounting end with a polygonal cross section engaged in a representative mating polygonal recess in said supporting plate.

18. A guiding arrangement, for guiding a sliding window pane during raising and lowering thereof, as claimed in claim 16, in which said guide rail is an angular cross section plate having a first leg oriented substantially perpendicularly to the surface of said window pane and a second leg oriented substantially parallel to the surface of said window pane, each of said legs constituting a flange having said sliding elements slidably engaged therewith; said supporting plate having portions bent at an angle to each other to form a pair of supporting plate legs each perpendicular to a respective leg of said guide rail adjacent thereto, each supporting plate leg mounting the sliding elements slidably engaged with the adjacent leg of said guide rail.

19. A guiding arrangement, for guiding a sliding window pane during raising and lowering thereof, as claimed in claim 16, in which said driving device comprises a cable and said power transmitting element comprises a driver secured to said cable; said driving device further comprising an elongated slotted cable guide tube extending in the direction of motion of said window pane through a distance equal to the effective stroke length of said driver, said driver projecting through the slot in said cable guide tube; said guide rail being fixedly secured to said cable guide tube and each of said flanges extending in spaced parallel relation to said cable guide tube; said driver being fixedly connected to said supporting plate.

20. A guiding arrangement, for guiding a sliding window pane during raising and lowering thereof, as claimed in claim 19, in which said window pane is the movable window pane of a door of an automotive vehicle; said guiding arrangement forming a unit with said driving device by virtue of the rigid connection of said guide rail to said cable guide tube; said guiding arrangement and said driving device being mountable, as a unit, on the door by means of disengageable fastening elements extending through apertures in said guide rail and in said driving device, and through recesses in a mounting surface of said door.

References Cited

UNITED STATES PATENTS

| | | | |
|---|---|---|---|
| 2,145,659 | 1/1939 | Lane | 49—350 X |
| 2,756,991 | 7/1956 | Busdiecker | 49—348 X |
| 3,209,412 | 10/1965 | Golde | 49—352 X |
| 3,228,677 | 1/1966 | Martens | 49—349 X |
| 3,280,509 | 10/1966 | Werner | 49—352 |
| 3,281,991 | 11/1966 | Colell | 49—352 |

DAVID J. WILLIAMOWSKY, *Primary Examiner.*

PHILIP C. KANNAN, *Assistant Examiner.*